United States Patent
Meernik et al.

(10) Patent No.: US 6,715,767 B1
(45) Date of Patent: Apr. 6, 2004

(54) ANGLED GAP COMPRESSION RINGS WITH END RELIEF

(75) Inventors: Paul Richard Meernik, Redford, MI (US); Thomas Arthur Perry, Washington, MI (US); Martin Stephen Kramer, Clarkston, MI (US); Larry Edward Byrnes, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/243,967

(22) Filed: Sep. 12, 2002

(51) Int. Cl.⁷ .................................................. F16J 9/12
(52) U.S. Cl. ........................ 277/459; 277/497; 277/499
(58) Field of Search ............................... 277/459, 496–9

(56) References Cited

U.S. PATENT DOCUMENTS

| | | | | |
|---|---|---|---|---|
| 1,280,739 A | * | 10/1918 | Hughes | 277/497 |
| 1,344,342 A | * | 6/1920 | Hanson | 277/486 |
| 1,357,729 A | * | 11/1920 | Schaap | 277/447 |
| 1,360,733 A | * | 11/1920 | Deutsch et al. | 277/497 |
| 1,360,820 A | * | 11/1920 | Thompson | 277/474 |
| 1,398,439 A | * | 11/1921 | McMaster | 277/497 |
| 1,470,113 A | * | 10/1923 | Davis | 277/497 |
| 1,499,571 A | * | 7/1924 | Davis | 277/434 |
| 1,658,440 A | * | 2/1928 | Hanigan | 277/459 |
| 1,757,877 A | * | 5/1930 | Roberts | 277/447 |
| 1,833,887 A | * | 12/1931 | Andrews | 277/497 |
| 2,462,586 A | * | 2/1949 | Whittingham | 277/452 |
| 2,569,777 A | * | 10/1951 | Phillips | 277/499 |
| 2,812,196 A | * | 11/1957 | Atkinson | 277/361 |
| 4,251,083 A | * | 2/1981 | Montes | 277/498 |
| 4,449,721 A | * | 5/1984 | Tsuge | 277/499 |
| 5,087,057 A | * | 2/1992 | Kurkowski | 277/497 |
| 5,253,878 A | * | 10/1993 | Miura | 277/499 |
| 5,618,048 A | | 4/1997 | Moriarty et al. | 277/193 |

OTHER PUBLICATIONS

"Automotive Mechanics", William Crouse, 1956 McGraw–Hill, pp 120–121.

* cited by examiner

*Primary Examiner*—Alison K. Pickard
(74) *Attorney, Agent, or Firm*—Kathryn A. Marra

(57) ABSTRACT

An engine piston compression ring designed to reduce the negative effects of ring end butting and reduce blowby. The compression ring has a gap forming an angle with a longitudinal axis of the ring or with a radius drawn from the axis. A relieved portion is provided along the upper or inner side of the ring adjacent one end, depending upon the direction of the gap angle. The relieved portion slopes along the upper or inner side toward the one end where the longitudinal thickness of the ring is smallest.

8 Claims, 2 Drawing Sheets

ANGLED GAP COMPRESSION RINGS WITH END RELIEF

TECHNICAL FIELD

This invention relates to engine piston compression rings having modified gap end configurations.

BACKGROUND OF THE INVENTION

It is known in the art relating to engine piston compression rings that joints between the ring ends should allow enough space to normally avoid ring gap end butting. The traditional approach used to minimize end butting has been to increase the gap size between the ring ends. However, increasing the gap size between the ring ends increases the amount of combustion gas blowby.

Various types of ring joints have been used including lap joints, angle joints, seal joints, and butt joints. However, modified ring joints may still allow end butting to occur under severe conditions such as low temperature cold starting and warm up.

SUMMARY OF THE INVENTION

The present invention provides engine piston compression rings which can minimize negative effects of ring gap end butting while optionally providing smaller ring gaps and reduced gas blowby in normal operation.

The invention controls deflection of the ring ends by using an angled joint and a relieved ring end. The angled joint and an appropriately placed relief area allow the relieved ring end to deflect a substantial distance after butting of the ring ends and before the relieved end engages a wall of an associated ring groove of the piston. The direction of deflection is controlled by the angle and direction of the ring joint. Deflecting the relieved portion of the ring end allows additional relative ring expansion after ring end butting without increasing the ring load against the cylinder bore. Thus, harmful effects of end butting are minimized and the gap between the ring ends can be reduced, resulting in reduced blowby.

In one embodiment of the invention, a compression ring has a gap that forms an angle with respect to a radius drawn from a longitudinal axis. Butting of the ring ends at the gap causes one end of the ring to be deflected inward and that one end is relieved for a portion along an inner edge. The relieved portion slopes outward toward the ring end where the radial thickness of the ring is smallest. This design creates end relief, which allows the relieved end of the ring to bend into the annular piston ring groove instead of increasing ring load against the cylinder bore.

A variation of the previously described embodiment has a slot adjacent the relieved portion that extends outward from the inner edge to promote bending of the relieved end. This slot decreases the force required during end butting to move the relieved end inward toward the piston instead of increasing ring load against the cylinder bore.

In another embodiment of the invention having a similarly angled gap, the relieved portion is generally circumferential with a transition portion to the full ring thickness. This design creates end relief, which allows the relieved end to bend a greater distance than the previous embodiments.

In a differing fourth embodiment, the compression ring has a gap that forms an angle with respect to the longitudinal axis of the ring. Butting of the ring ends at the gap causes one end of the ring to slide up on the angled other end so that the one end is relieved for a portion along the upper side of the ring. The relieved portion slopes downward toward the ring end where the longitudinal thickness of the ring is smallest. This design creates a form of end relief which allows the relieved end of the ring to slide toward the top of the annular piston ring groove instead of bending in toward the inner diameter of the ring groove like the other embodiments referred to.

The invention is particularly useful in avoiding negative effects of ring end butting which may occur under severe low temperature cold engine starting and warm-up conditions. However, it can also reduce effects of end butting under other conditions and may be used to reduce ring gap dimensions with resulting reductions of gas blowby during normal engine running.

These and other features and advantages of the invention will be more fully understood from the following description of certain specific embodiments of the invention taken together with the accompanying drawings.

DESCRIPTION OF THE PREFERRED EMBODIMENT

Figure 1:
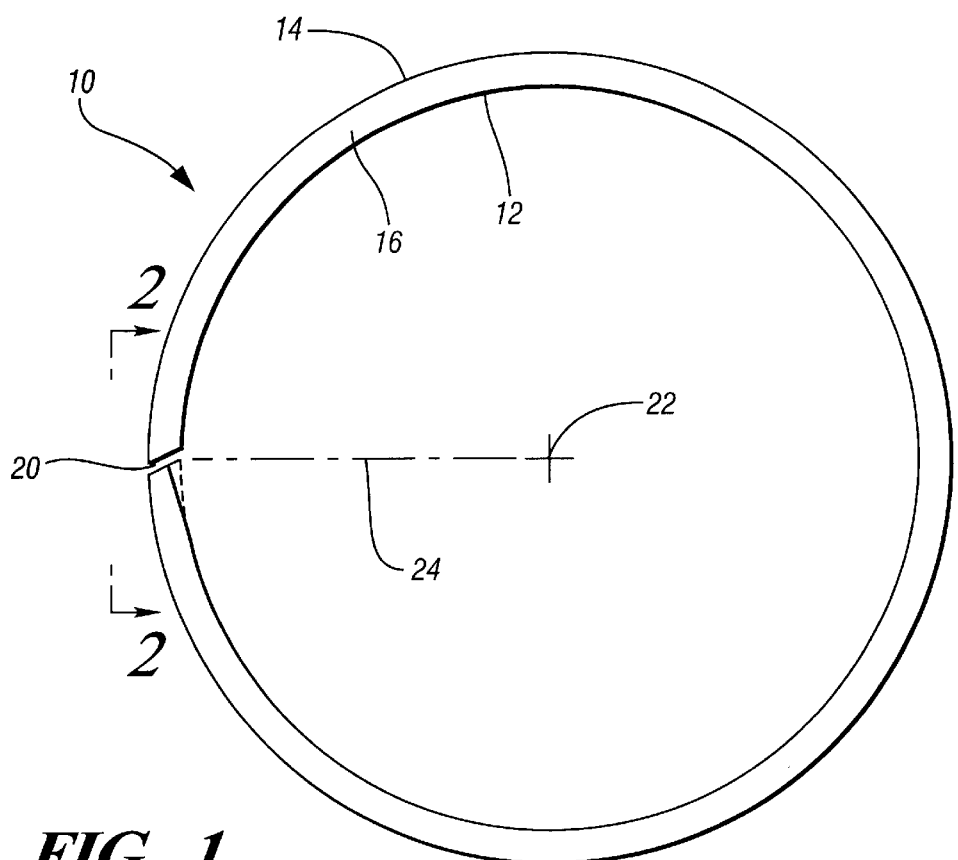
FIG. 1 is a top view of a first embodiment of engine piston compression ring according to the invention.
Figure 2:
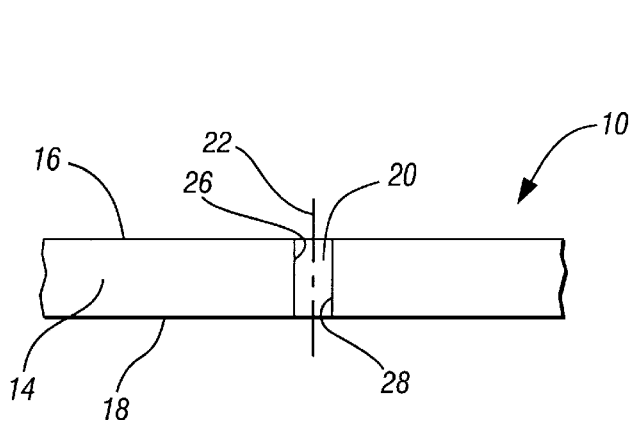
FIG. 2 is an enlarged side view from the line 2—2 of FIG. 1 showing the gap portion of the ring.

Referring now to FIGS. 1 and 2 of the drawings in detail, numeral 10 generally indicates an engine piston compression ring. Ring 10 includes an inner edge 12, outer face 14, upper side 16, and a lower side 18. A gap 20 is cut through the ring to provide for installation and expansion. Ring 10 is centered on a longitudinal axis 22 and has a radius 24 extending through the gap 20. The gap extends parallel with the longitudinal axis 22.

FIGS. 3–7 following indicate various embodiments of the invention wherein like numerals refer to like features.

Figure 3:
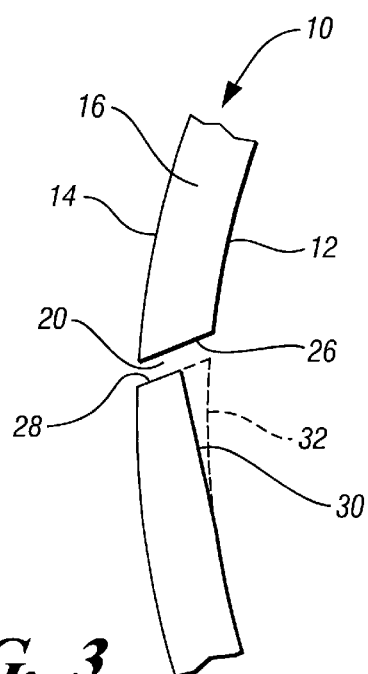
FIG. 3 is an enlarged top view of the gap portion of the ring shown in FIG. 2.

FIG. 3 shows enlarged the portion of the ring 10 in the circle 2 of FIG. 1 including the gap 20. Gap 20 is defined by opposed ends 26, 28 of the ring and is cut at an angle with respect to the radius 24. The inner edge 12 of the ring is cut away adjacent the end 28 to form a relieved portion 30. The relieved portion 30 is sloped outward toward the end 28, where the radial thickness of the ring is smallest. Dashed line 32 indicates the outline of the normal ring thickness, showing the region of end relief.

Figure 4:
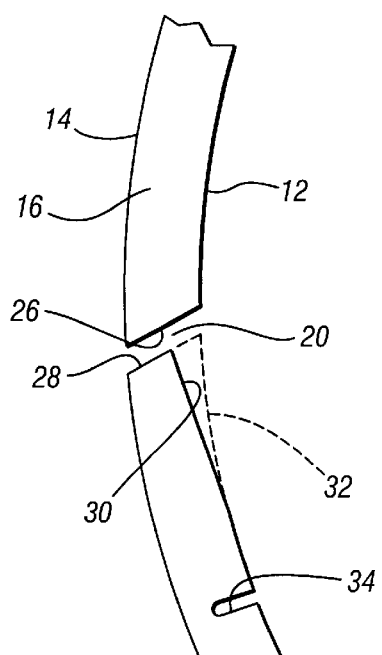
FIG. 4 is a view similar to FIG. 3 showing a modified embodiment of piston compression ring.

FIG. 4 is similar to FIGS. 1–3 but differs in that the ring 33 includes a slot 34 adjacent to relieved portion 30 to increase resilience of the relieved portion 30.

Figure 5:
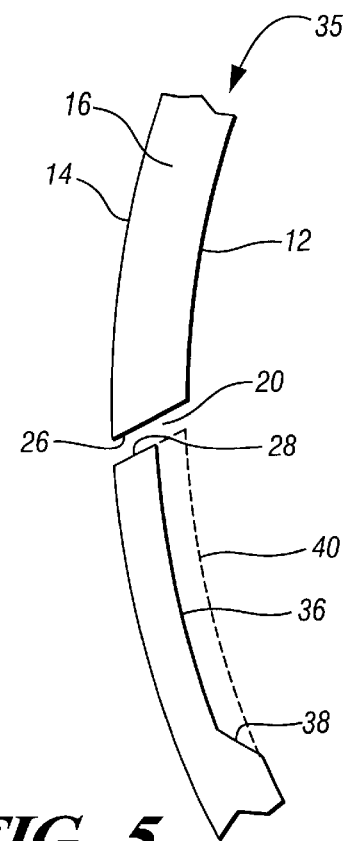
FIG. 5 is a view similar to FIGS. 3 and 4 showing another modified embodiment of piston compression ring.

FIG. 5 is similar to FIGS. 1–3 but differs in that ring 35 has a modified relieved portion 36. Relieved portion 36 has a reduced radial thickness with a generally circumferential configuration and adjoins a transition portion 38 extending to the full ring depth for further increasing resilience. Dashed line 40 indicates the outline of the normal ring thickness.

Figure 6:
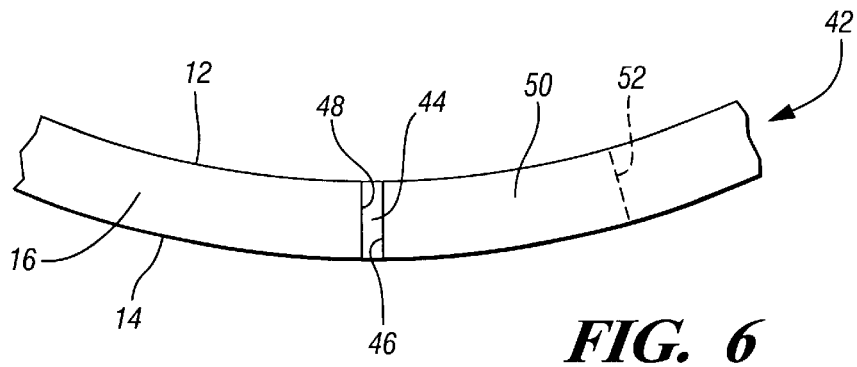
FIG. 6 is an enlarged fragmentary top view showing the gap portion of a distinct alternative embodiment of piston compression ring according to the invention.
Figure 7:
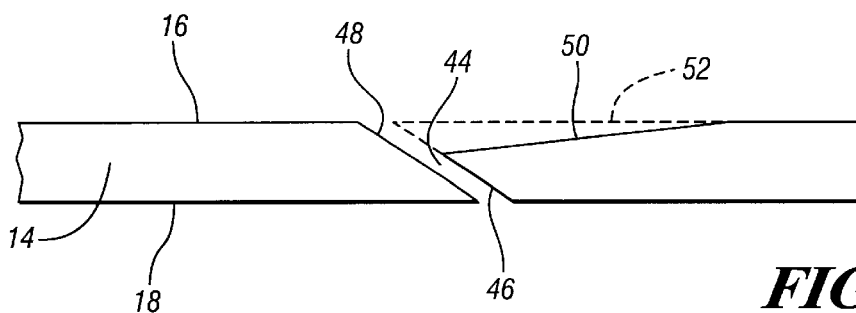
FIG. 7 is an enlarged fragmentary side view of the embodiment of FIG. 6.

FIGS. 6 and 7 show another embodiment of piston compression ring 42 wherein a gap 44 is cut through the ring to provide for installation and expansion. The ring is also centered on a longitudinal axis 22 and has a radius 24 extending through the gap 44. The ring differs from the previously described embodiments in that the gap 44 forms an angle with respect to the longitudinal axis 22 but is aligned with the radius 24. Gap 44 is defined by opposed ends 46, 48 of the ring. The upper side 16 of the ring is cut away adjacent the end 46 to form a relieved portion 50. The relieved portion 50 slopes downward toward the end 46 where the longitudinal thickness of the ring is smallest. Dashed line 52 indicates the outline of the normal ring thickness, showing the region of end relief.

Note that, in each of the embodiments illustrated, the circumferential length of the relief is greater than the angled length of the gap.

In operation of the embodiments of FIGS. 1–7 the ring ends may butt in extreme conditions, such as cold engine starting and warm up. In the embodiments of FIGS. 1–5 extreme conditions may cause the gap 20 to close and the ring ends 26, 28 to butt. Further relative expansion of the ring then causes the relieved end 28 to slide along the opposite angled end 26 as the relieved end 28 is deflected inward toward the inner diameter of the annular piston ring groove. This allows additional relative expansion of the ring to occur without increasing the ring load against the cylinder bore.

In the embodiments of FIGS. 6–7 extreme conditions may cause the gap 44 to close and the ring ends 46, 48 to butt. Further relative expansion of the ring then causes the relieved end 46 to slide along the opposite angled end 48 as the relieved end 46 is deflected upward toward the top of the annular piston ring groove. This allows additional expansion to occur without increasing the ring load against the cylinder bore.

The placement and amount of ring end relief which may be provided may be varied to suit particular engine characteristics, operating conditions and piston ring design. However, the advantages of the concept, of which the foregoing embodiments represent only examples, include extension of the ability of an engine to operate in severe conditions of cylinder bore contraction or piston ring expansion and/or the reduction of ring end gap dimensions with resulting reductions of gas blowby.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An engine piston compression ring centered on a longitudinal axis and having upper and lower sides, an inner edge, an outer face, and an end gap defined by circumferentially opposed ends, and the improvement wherein:

the gap forms an angle with respect to a radius drawn from the longitudinal axis;

one of the ends is relieved for a distance from the gap along the inner edge, forming a relieved portion adjacent the one end; and the relieved portion slopes continuously outward toward the one end.

2. A compression ring as in claim 1 wherein a slot adjacent the relieved portion extends outward from the inner edge to promote flexing of the relieved portion.

3. A compression ring as in claim 1 wherein the circumferential length of the relieved portion is greater than the angled length of the gap.

4. An engine piston compression ring centered on a longitudinal axis and having upper and lower sides, an inner edge, an outer face, and an end gap defined by circumferentially opposed ends, and the improvement wherein:

the gap forms an angle with respect to the longitudinal axis; and one of the ends is relieved for a distance from the gap along the upper side, forming a relieved portion adjacent the one end wherein the circumferential length of the relieved portion is greater than the angled length of the gap.

5. A compression ring as in claim 4 wherein the relieved portion slopes downward toward the one end.

6. A compression ring as in claim 5 wherein the gap is aligned with a radius drawn from the longitudinal axis.

7. An engine piston compression ring centered on a longitudinal axis and having upper and lower sides, an inner edge, an outer face, and an end gap defined by circumferentially opposed ends, and the improvement wherein:

the gap forms an angle with respect to a radius drawn from the longitudinal axis;

one of the ends is relieved for a distance from the gap along the inner edge, forming a relieved portion adjacent the one end; and the relieved portion slopes outward toward the one end and a slot adjacent the relieved portion extends outward from the inner edge to promote flexing of the relieved portion.

8. A compression ring as in claim 7 wherein the circumferential length of the relieved portion is greater than the angled length of the gap.

* * * * *